May 15, 1928.  T. N. RUSSELL  1,669,629
CAR ROOF
Filed Jan. 9, 1924  9 Sheets-Sheet 1

May 15, 1928.

T. N. RUSSELL

CAR ROOF

Filed Jan. 9, 1924

Inventor:
Thomas Nathan Russell
By Munday, Clarke & Co.
Attys.

May 15, 1928. 1,669,629
T. N. RUSSELL
CAR ROOF
Filed Jan. 9, 1924 9 Sheets-Sheet 7

Inventor:
Thomas Nathan Russell
By Munday Clarke Carpenter
Attys.

May 15, 1928. 1,669,629
T. N. RUSSELL
CAR ROOF
Filed Jan. 9, 1924  9 Sheets-Sheet 8

Inventor:
Thomas Nathan Russell
By Munday, Clark & Loof
Attys.

May 15, 1928. 1,669,629
T. N. RUSSELL
CAR ROOF
Filed Jan. 9, 1924 9 Sheets-Sheet 9

Inventor:
Thomas Nathan Russell
By Munday Clarke & Carpenter
Attys.

Patented May 15, 1928.

1,669,629

UNITED STATES PATENT OFFICE.

THOMAS NATHAN RUSSELL, OF CHICAGO, ILLINOIS, ASSIGNOR, BY MESNE ASSIGNMENTS, TO CHICAGO-CLEVELAND CAR ROOFING COMPANY, OF CHICAGO, ILLINOIS, A CORPORATION OF DELAWARE.

CAR ROOF.

Application filed January 9, 1924. Serial No. 685,257.

This invention relates in general to improvements in car roof construction, and more particularly to improvements in the "outside metal type" of car roofs, and objects of the invention are the production of a metallic car roof of the above mentioned type which will be of simple manufacture at reasonable cost and readily and easily assembled onto a wooden roof sheathing without requiring especially skilled workmen and with attendant reduction in the cost of applying the metallic roof to the car, the provision of a metallic car roof so constructed and arranged that frequent repair and replacement will not be required by reason of the constant chafing of the cooperative metallic parts, the provision of a roof construction having a metallic flashing that thoroughly weather-proofs the eaves edge of the car and yet is normally out of contact with the next adjacent roof sheet so that the constant chafing of the parts is avoided, the provision of a rigidified roof sheet which will not require special parts to hold the eaves edges of the sheet down on the car, and such other objects and advantages of the invention as may be found to obtain in the structure hereinafter set forth and claimed.

In the accompanying drawings, forming a part of this specification, and showing, for purposes of exemplification, a preferred form and manner in which the invention may be embodied and practiced, but without limiting the claimed invention specifically to such illustrative instance or instances.

Referring to Figs. 1, 2, 4 and 8 the upper frame work of the car is illustrated by the metallic carlines 10, wooden ridge pole 11, metallic Z-bar plates 12, turned on their side to provide a horizontal web 13, an upwardly extending vertical flange 14, and an outer depending flange 15. The carline 10 is depressed at 16 to receive the top flange 17 of a bracket 18 which is riveted to the top of the carline at 19 and the bracket is also provided with a depending portion 20 interposed between the end of the carline and the flange 14 to which it is riveted by rivets 21. Secured to the outer face of said flange 14 is a wooden fascia 22 extending longitudinally along said side plates. The top of the fascia board is flush with the top of the end of the carline, and the wooden roof sheathing 23 that is secured on said framework preferably has its outer lower edge flush with the inner upper edge of said fascia board. This wooden inside roof sheathing 23 is gained out or offset at 24 at each eaves edge and longitudinally of the car.

Figure 1:
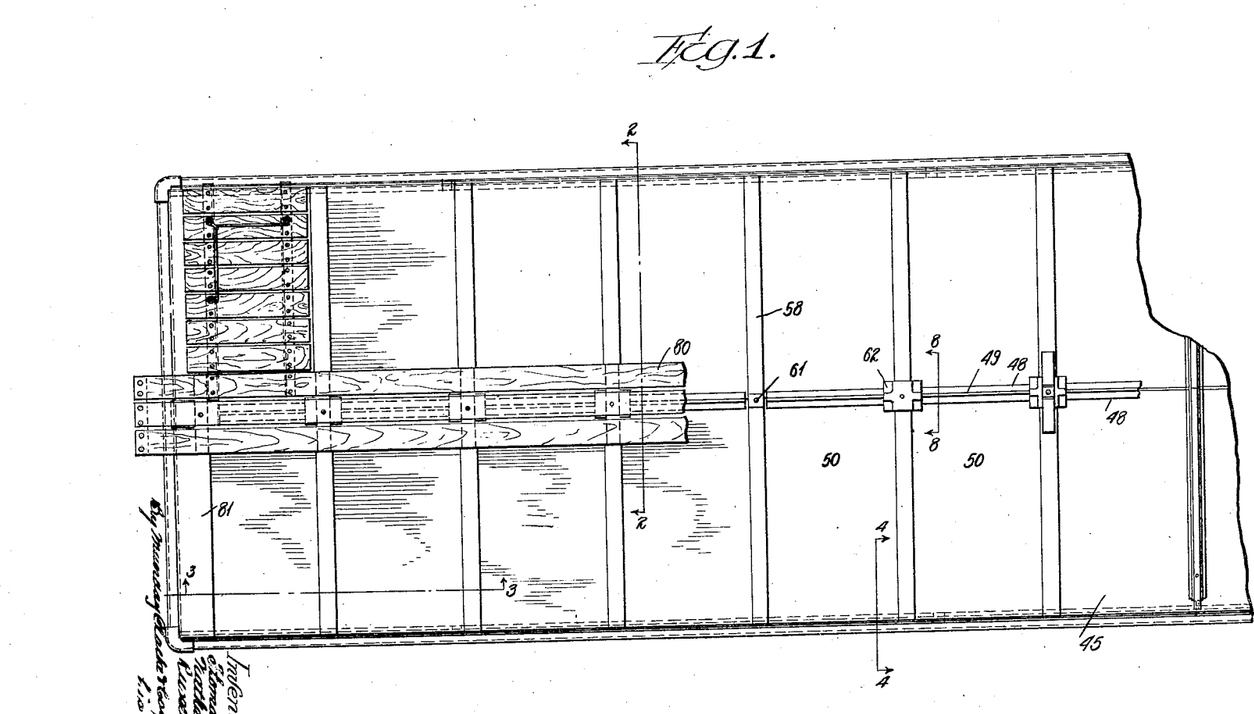
Figure 1 is a top plan view of a part of a car roof embodying the invention.
Figures 2, 3, 33, 34, 35, 36, 37, 38:
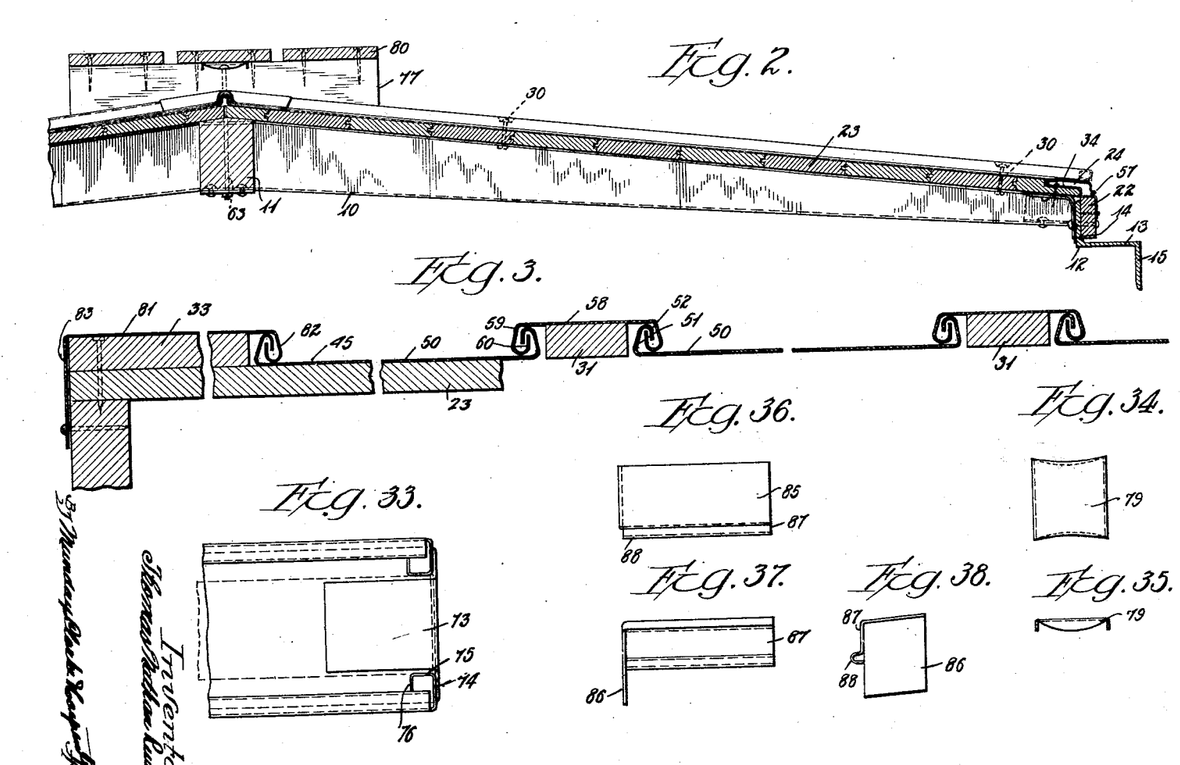
Fig. 2 is a vertical cross section taken on the line 2—2 of Fig. 1.
Fig. 3 is a horizontal cross section taken on the line 3—3 of Fig. 1.
Fig. 33 is a bottom plan view of one end of a mullion cap showing the mullion in dotted lines.
Fig. 34 is a top plan view of a cover plate for bolt-head of the running board saddle.
Fig. 35 is a side elevational view of the same.
Fig. 36 is a top plan view of an end closure for the end mullion caps.
Fig. 37 is an end view of the same.
Fig. 38 is a side view of a part of the same.
Figures 4, 39:
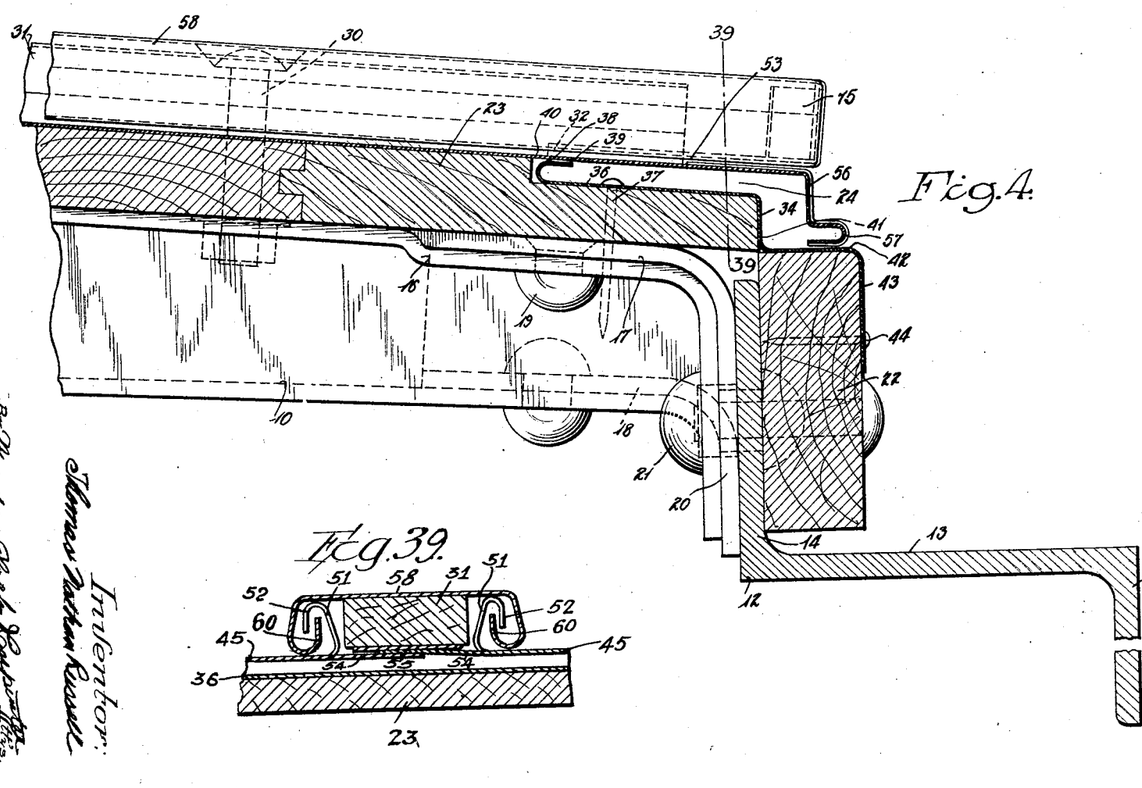
Fig. 4 is a vertical cross section taken on the line 4—4 of Fig. 1.
Fig. 39 is a sectional view taken on the line 39—39 of Figure 4.
Figure 5:
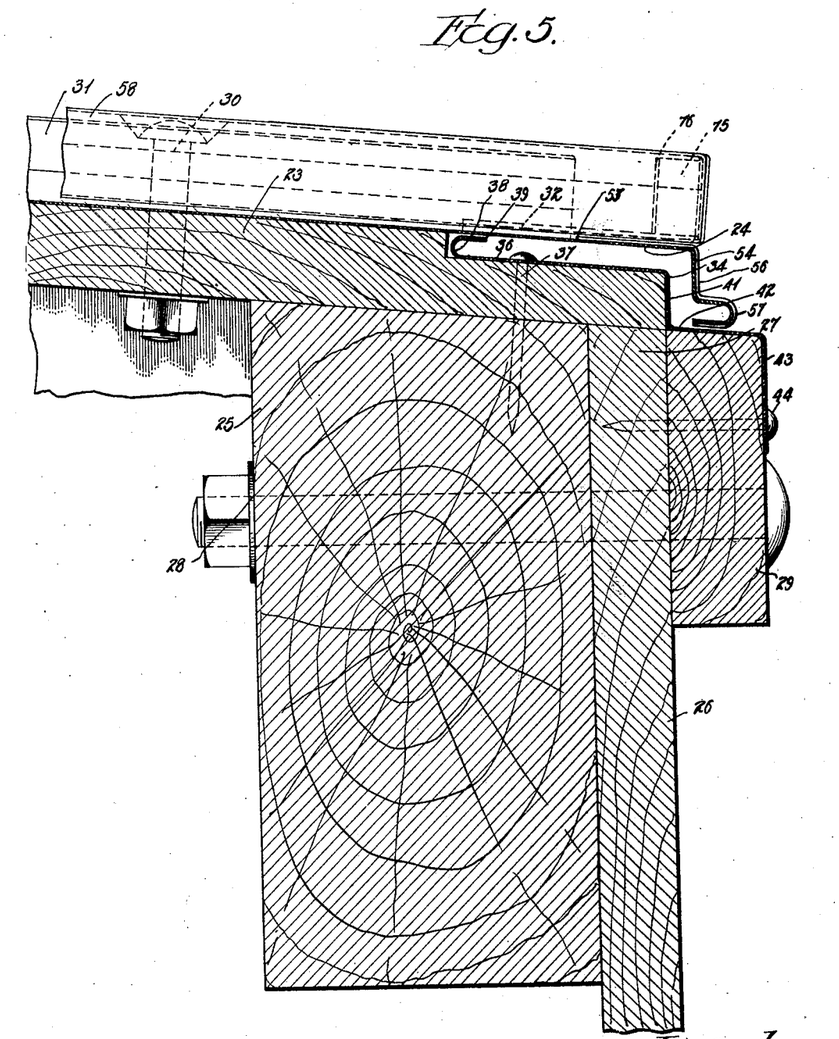
Fig. 5 is a view similar to Fig. 4, but showing the application of the invention to a car having a wooden side plate.
Figure 6:
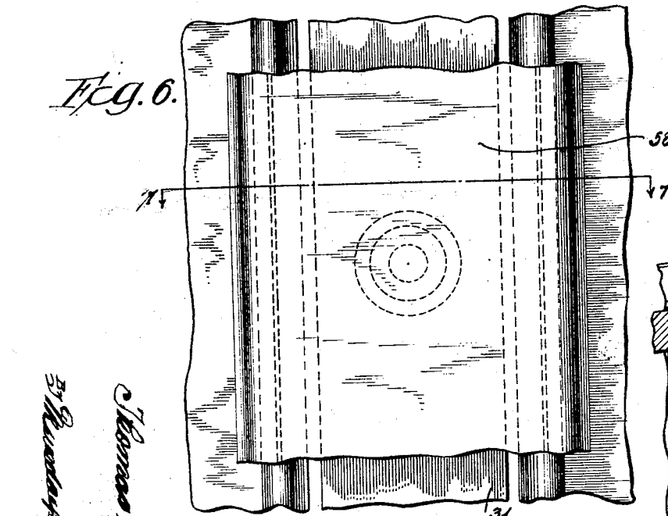
Fig. 6 is a partial top plan view showing the positions of the roof sheet, mullion and mullion cap in assembled relation.
Figure 7:
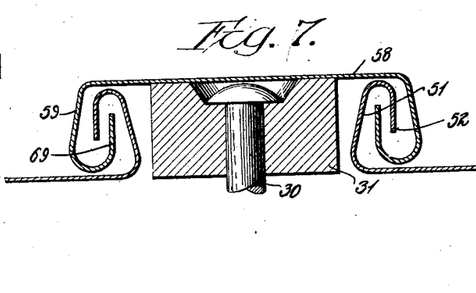
Fig. 7 is a section taken on the line 7—7 of Fig. 6.
Figure 8:
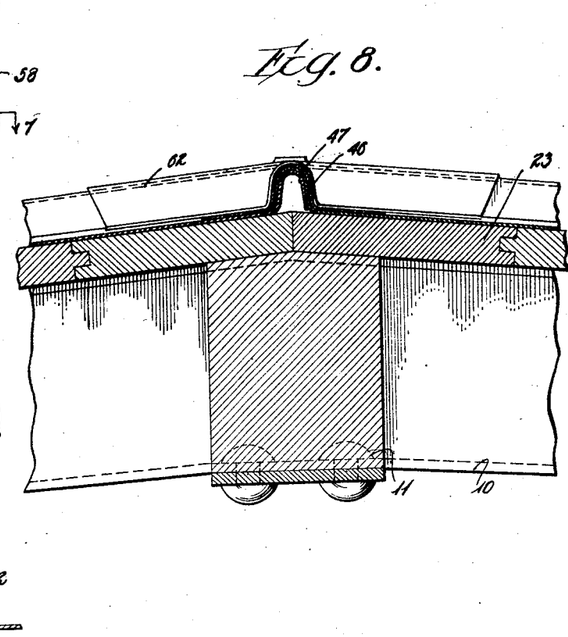
Fig. 8 is a vertical cross section taken at the ridge on the line 8—8 of Fig. 1.
Figure 9:
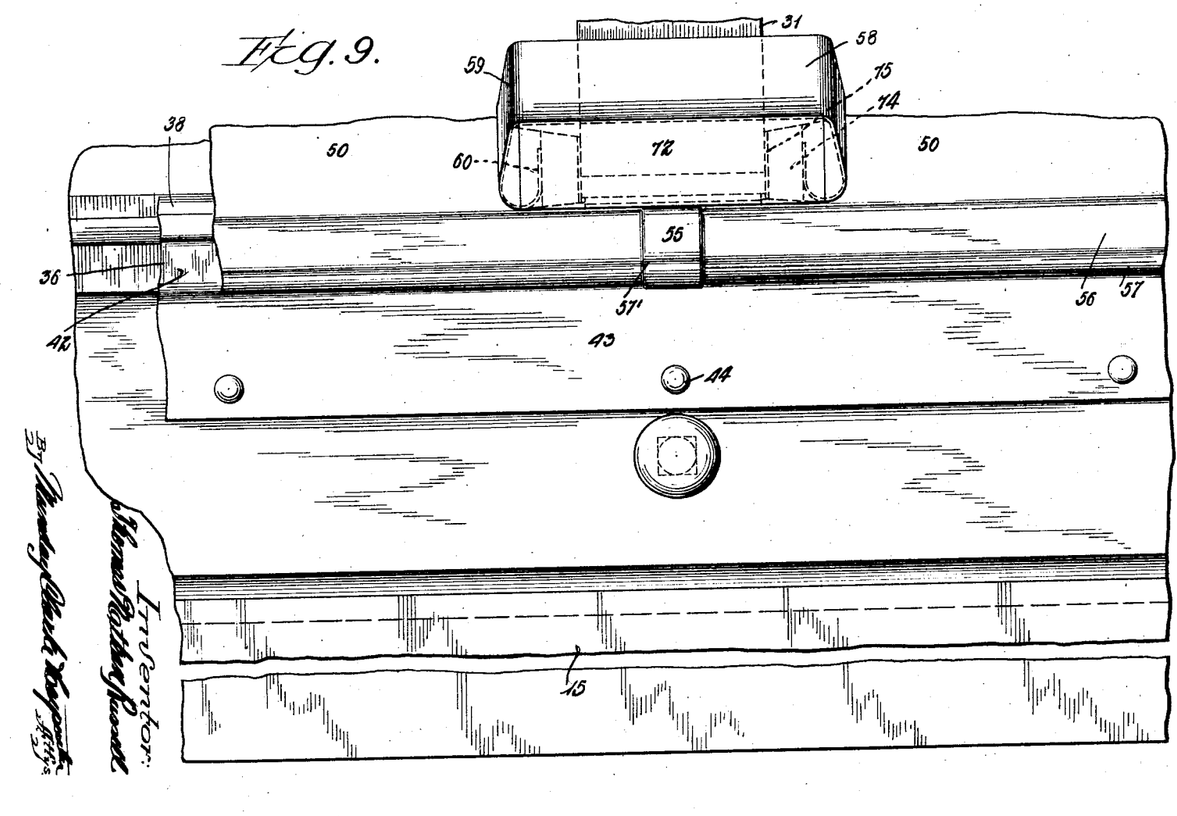
Fig. 9 is an end elevational view taken at the side of the car, showing the application of mullion caps.
Figures 10, 12:
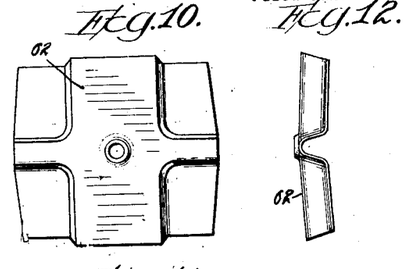
Fig. 10 is a top plan view of a ridge corner cap.
Fig. 12 is a side elevational view of the same cap.
Figure 11:
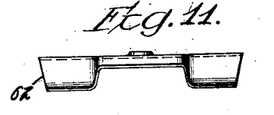
Fig. 11 is an end elevational view of the same.
Figure 13:
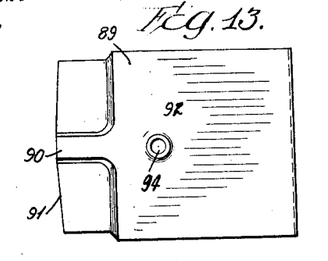
Fig. 13 is a top plan view of an end ridge cap.
Figure 14:
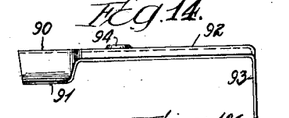
Fig. 14 is a side elevation of the same.
Figure 15:
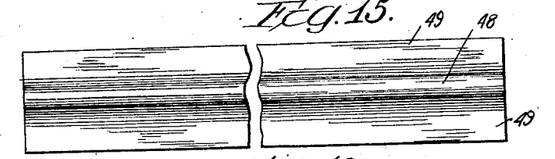
Fig. 15 is a top plan view of a ridge cap.
Figures 16, 18, 19:
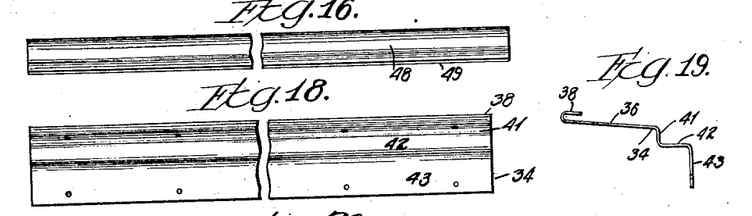
Fig. 16 is a side elevation of the same.
Fig. 18 is a front elevational view of an eaves flashing strip.
Fig. 19 is a side elevational view of the same.
Figure 17:
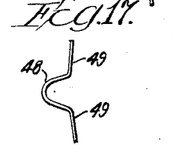
Fig. 17 is an end elevational view of the same.
Figure 20:
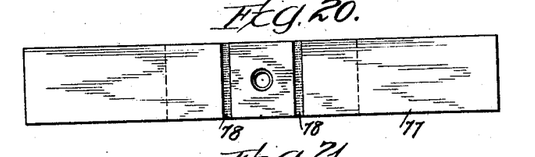
Fig. 20 is a top plan view of a running board saddle.
Figure 21:
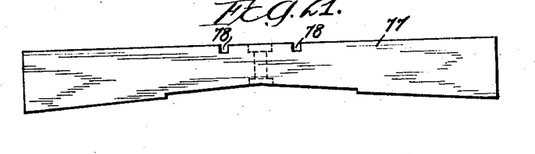
Fig. 21 is a side elevation of the same.
Figure 22:
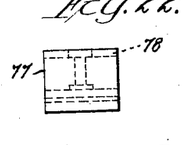
Fig. 22 is an end view of the same.

As shown more particularly in Fig. 5, the side plate is made of a wooden beam 25 and wooden side sheathing 26 is secured thereto having its upper edges 27 flush with the top of the side plate 25; and extending along the top of said sheathing 26 and secured thereto by bolts 28, that pass through the side plate 25 also, is a wooden fascia 29 whose top edge is flush with the top edges of said side sheathing. The wooden inside roof extends over the side plates and the top edges of the side sheathing and the outer lower edge of said roof sheathing is flush with the top inner edge of said fascia board.

Extending transversely of the roof sheathing, and secured by bolts 30, at spaced intervals along the roof are the usual wooden mullions 31 that extend over the outside lines of the wood roof. These mullions may be gained out at 32 at their eaves ends to receive the under-bent tongue of mullion caps to be herein later described. At each end of the car wooden end mullions 33 are secured which are in this case illustrated as being wider than the mullions 31.

To weather-proof the eaves edges of the car metallic flashings 34 are provided having a portion 36 secured at 37 in the gained out eaves of the roof sheathing. The portion 36 is flanged upwardly at its inner edge to provide an upwardly open return bent portion 38 whose upper flange 39 is just below the top surface 40 of the roof sheathing, and at its eaves edge the portion 36 is flanged downwardly at 41 to enclose the edges of the roof sheathing and then flanged outwardly at 42 to enclose the top of the fascia boards; and the portion 42 terminates in a depending flange 43 secured to the outer face of said side fascia by nails 44. By the arrangement just described it will be seen that there is provided by the flange 41 of the flashing a vertical wall at the end of the roof sheathing which is advantageous in that it prevents rain from being driven into the upper portion 36 of the flashing except under extraordinary conditions.

To weather-proof said roof sheathing, outside metallic coverings are provided which, when assembled on said roof sheathing between said mullions, will accommodate themselves to the weaving and racking movements of the car, but will not be subject to constant chafing action of the roof sheets and the flashing. These roof sheets 45 extend from the ridge of the roof to the eaves and extend down over the outside lines of the roof, normally out of contact with said flashing. At their ridge ends, the roof sheets 45 are flanged upwardly and outwardly providing an inverted-U shaped flange 46 and the adjacent flanges 46 of roof sheets disposed on opposite sides of the ridge are lapped one over the other at 47. To weather-proof these joints and to hold said roof sheets against abnormal movement towards the eaves, and yet permitting a proper amount of movement longitudinally of the roof, ridge caps 48 of inverted channel shape are provided, having outwardly extending flange 49 resting on the main body 50 of the sheets. The sides of said body 50 are flanged upwardly providing an upwardly and inwardly inclined portion 51 terminating in a depending portion 52 spaced from the main body 50 of the sheets. These flange portions 51 and 52 extend from the ridge to a point 53 short of the eaves, and the unflanged sides of said sheets are continued outwardly providing ears or extensions 54 inserted in the recesses provided by said gaining out of the mullions, and the adjacent extensions of roof sheets, disposed on the opposite sides of the mullions, are lapped at 55 under the eaves ends of the mullions thereby providing a weather-tight joint and also serving to hold the eaves edges of the roof sheets in place and against upward movement. The eaves edges of said roof sheets terminate in a depending flange 56 extending down over the outside lines of the roof and the lower edge of the flange 56 is formed with a bead 57 outwardly projecting and extending longitudinally of the car. The adjacent edges of flanges 56 of adjacent roof sheets are lapped at 57'. This bead 57 serves to finish off the edge of the flange and to rigidify it and prevent the sheet edge from buckling up and also serves to keep out water and dirt or cinders.

When the roof sheets are assembled, the main bodies 50 of the roof sheets are normally out of contact with the flashing and its return bent portion 38, and the depending flange 56 is spaced from the edge of the roof to allow for proper movement of the roof sheets when subjected to weaving or racking motion, and the bead 57 also is normally spaced from the flashing portion 42.

Mullion caps 58 are secured over the mullions and have depending side flanges 59 rebent to provide an upwardly projecting flange 60 that is hooked between the portions 51 and 52 of the roof sheets 2 allow the roof sheets to have sufficient movement between the mullions and hold the sheets in position and also render the joints therebetween weather-tight. At their ridge ends, the mullion caps are provided with extensions 61, and the adjacent extensions of mullion caps disposed on opposite sides of the ridge are lapped. To weather proof this joint and to hold the ridge caps 48 and the mullion caps 58 in position, ridge corner caps 62 are provided thereover and a bolt 63 passes through said ridge corner cap and the lapped extensions of the mullions, thereby securing them and the ridge caps and roof sheets in position.

Figure 23:
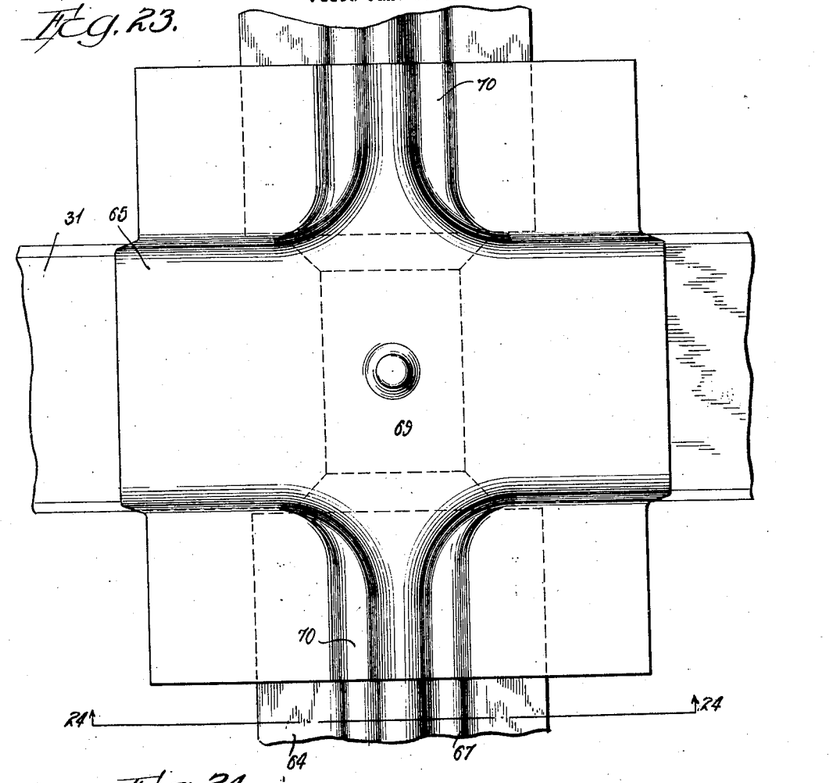
Fig. 23 is a top plan view of a ridge corner construction showing a modified form of ridge corner cap and corner cap.
Figure 24:
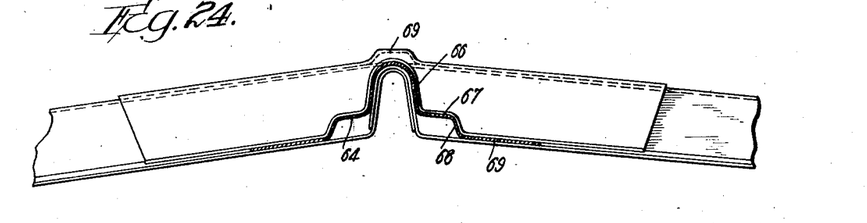
Fig. 24 is a vertical cross section taken on the line 24—24 of Fig. 23 showing the application of the same to the roof sheets at the ridge.
Figure 25:
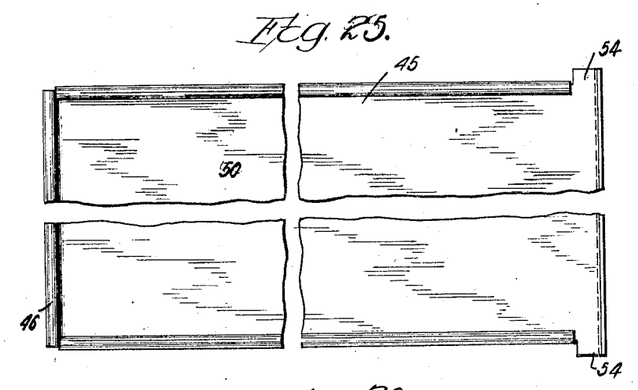
Fig. 25 is a top plan view of an intermediate roof sheet.
Figure 26:
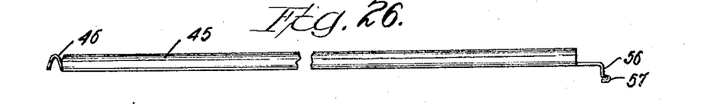
Fig. 26 is a side elevational view of the same.
Figure 27:
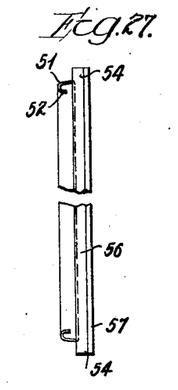
Fig. 27 is an end elevational view of the same.
Figures 28, 29, 30:
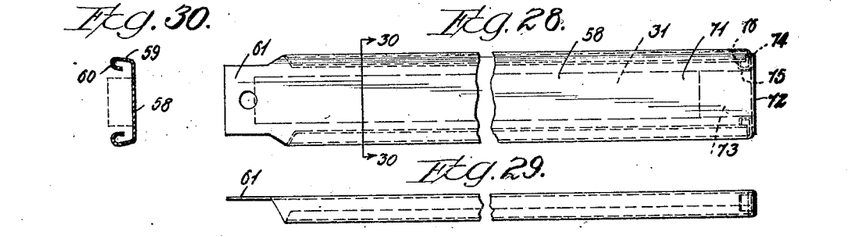
Fig. 28 is a top plan view of a mullion cap.
Fig. 29 is a side elevational view of the same.
Fig. 30 is a cross section taken on the line 30—30 of Fig. 29.
Figures 31, 32:
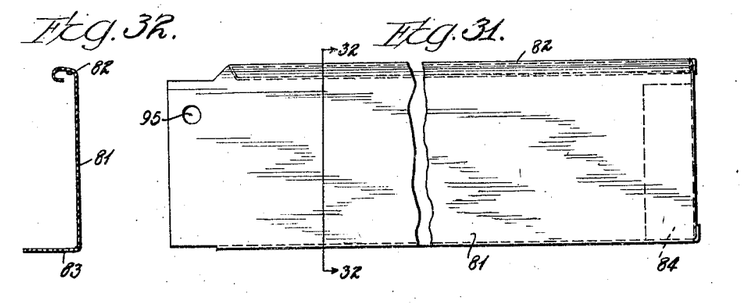
Fig. 31 is a top plan view of an end mullion cap.
Fig. 32 is a section taken on the line 32—32 of Fig. 31.

Referring to Figs. 23 and 24, I have shown another type of ridge cap 64 and corner cap 65. The ridge cap 64 is of inverted channel shape having sides 66 bent outwardly at 67 above the main body of the roof sheet and these portions 67 are bent downwardly at 68 and terminate in outwardly extending flanges 69 resting on said body 50. The corner caps 65 are formed to provide intersecting inverted channels and at the center are pressed upwardly at 69. The sides of the inverted channel that fit over the ridge caps 64 are offset at 70 to fit over the portions 67 and 68 of the caps 64.

At their eaves ends, the tops 71 of the mullion caps 51 are bent downwardly at 72 to enclose the ends of the cap and the portion 72 is bent to provide a tongue 73 turned inwardly under the mullion and in contact therewith to hold the cap against upward movement and to protect the under face of the mullion against the elements. The side flanges 59 of the mullion caps at each eaves end are bent inwardly at 74 towards the mullion and this portion 74 is bent longitudinally of the mullion at 75 and the portion 75 is bent outwardly at 76 towards the side flanges 59, away from the mullions, providing an abutment to engage tightly against the sides of the mullions to prevent any lateral or transverse movement of the mullion cap with respect to said mullion end.

Wooden running board saddles 77 are secured over the mullion cap at the ridge and are recessed at 78 in their tops to receive a bolt head cover cap 79. The usual running boards 80 are fastened in any desired manner to these saddles.

End mullion caps 81 are provided to enclose the end mullions and the inner sides of these caps are flanged at 82 in the same manner as the intermediate mullion caps, but the outer edge of these caps 81 terminate in depending flanges 83 secured to the end of the car. At each eaves end, these caps 81 are provided with a tongue 84 turned under the end mullion and end closure caps 85 are fitted over the ends of these end mullion caps. One side of these closure caps consists of a straight depending flange 86 secured to the end of the car, and the other or eaves side of said cap consists of a depending flange 87 having a bead 88 fitting the bead in the flange of the roof sheet therebeneath.

The ridge caps are closed at each end of the car by ridge end caps 89 having an inverted channel portion 90 fitting the lapped ridge flange of roof sheets therebeneath, and sheet body flanges 91, a top portion 92 fitting over the lapped extensions 93' of the end mullion caps and a depending flange 93 secured to the end of the car. These caps 89 are secured to the substructure by bolts passing through apertures 94 therein and apertures 95 in the extensions 93'.

The invention as hereinabove set forth is embodied in a particular form of construction but may be variously embodied within the scope of the claims hereinafter made.

I claim:

1. In a car roof, in combination: roof sheathing; mullions secured transversely at intervals along the top of said sheathing; roof sheets occupying the spaces between said mullions on opposite sides of the ridge, each of said roof sheets having along its ridge end a flange, said flanges of roof sheets on opposite sides of the ridge mutually engaging each other; ridge caps enclosing said engaged flanges; said roof sheets having side flanges bent upwardly and then downwardly; said roof sheets having extensions inserted under the eaves ends of said mullions and adjacent extensions being lapped under said mullions; the eaves ends of said roof sheets terminating in a depending flange spaced from the roof sheathing; mullion caps enclosing said mullions and having depending side flanges loosely internally locking with said side flanges of the roof sheets.

2. In a car roof, in combination: roof sheathing; mullions secured transversely at intervals along the top of said sheathing; roof sheets occupying the spaces between said mullions on opposite sides of the ridge, each of said roof sheets having along its ridge end a flange, said flanges of roof sheets on opposite sides of the ridge mutually engaging each other; ridge caps enclosing said engaged flanges; said roof sheets having side flanges bent upwardly and then downwardly; said roof sheets having extensions inserted under the eaves ends of said mullions and adjacent extensions being lapped under said mullions; the eaves ends of said roof sheets terminating in a depending flange spaced from the roof sheathing; said depending flange having an outwardly projecting bead extending longitudinally of the car; mullion caps enclosing said mullions and having depending side flanges loosely interlocking with said side flanges of the roof sheets.

3. In a car roof, in combination: roof sheathing; mullions secured at intervals thereon; roof sheets occupying the spaces between said mullions; each of said roof sheets having along its ridge end a flange; ridge caps enclosing adjacent ridge end flanges of the roof sheets; the side edges of said roof sheets being flanged; mullion caps enclosing the mullions and the roof sheet side flanges; the eaves ends of said mullion caps being flanged to enclose the ends of said mullions, portions of said mullion cap side flanges engaging the sides of said mullions at the eaves ends of the mullions.

4. In a car roof, in combination: roof sheathing; said roof sheathing being gained out at the eaves to receive a flashing; mullions secured on said roof sheathing; roof sheets occupying the space between said mullions; the ridge ends and sides of said roof sheets being flanged; ridge caps loosely enclosing adjacent ridge end flanges; mullion caps enclosing said mullions and roof sheet side flanges so as to permit their movement; a flashing secured in said gained out roof sheathing, said flashing having a portion depending over the outside lines of the roof, the eaves ends of said roof sheet extending over the side of the car and terminating in a depending flange provided with a rigidifying bead, said roof sheet extending over said flashing and normally out of contact therewith.

5. In a car roof, in combination: roof sheathing, said roof sheathing being gained out at the eaves to receive a flashing; mullions secured on said roof sheathing; roof sheets occupying the spaces between said mullions; the ridge ends of said roof sheets being lapped one over the other, a cap enclosing said lapped flanges; the sides of said sheets being flanged upwardly; mullion caps secured over said mullions and loosely confining the side flanges of said roof sheets; a flashing positioned in said gained out roof sheathing, said flashing having a return bend over said flashing at its inner edge and a depending portion directed down over the eaves edge of the roof; the eaves end of said roof sheets extending over said flashing and terminating in a depending flange extending over the outside lines of said roof and having an outwardly directed reinforcing bead formed integrally with said depending flange; said roof sheet and its depending eaves flange being normally out of contact with said flashing.

6. A mullion cap comprising a top portion and depending side flanges, the top portion at the eaves end being bent downwardly and then inwardly, the eaves ends of said side flanges being bent towards the center of said cap and this portion bent to provide a portion extending in the direction of the length of said cap, said last mentioned portion being bent outwardly towards the side flanges.

7. A mullion cap comprising a top portion and depending side flanges normally spaced from the side edges of the mullion, portions of said flanges being adapted to engage the mullion to maintain the cap in its normal position.

8. A roof sheet having a main body; side flanges; a ridge flange; the eaves edge of said sheet being bent to provide a depending eaves flange, said depending eaves flange terminating in an outwardly projecting longitudinally extending rigidifying bead substantially U-shaped in section, the legs of the U-shaped rigidifying bead being disposed in a substantially horizontal plane so that adjacent bead portions of neighboring sheets may be arranged in overlapping relation.

9. A roof sheet having a main body; side flanges, said side flanges extending from the ridge to a point short of the eaves and the unflanged portion of the sheet beyond said side flange forming flat extensions disposed in the plane of the main body of said sheet; a ridge flange, the eaves edge of said sheet being bent to provide a depending eaves flange, said depending eaves flange being provided with an outwardly projecting longitudinally extending rigidifying bead.

10. In a car roof, in combination, roof sheathing, mullions secured transversely at intervals along the top of said sheathing, and roof sheets occupying the spaces between said mullions on the ridge of said roof, each of said roof sheets terminating adjacent the ridge of said roof, said roof sheets having extensions inserted under the eaves ends of said mullions, adjacent extensions of said sheets being lapped under said mullions, the eaves ends of said roof sheets terminating in a depending flange spaced from the roof sheathing.

11. In a car roof, in combination, roof sheathing, mullions secured at intervals thereon, roof sheets occupying the spaces between said mullions, each of said roof sheets terminating adjacent the ridge of said roof, and flanged mullion caps enclosing the mullions, the eaves ends of said mullion caps being flanged to enclose the ends of said mullions, portions of said mullion cap side flanges engaging the sides of said mullions at the eaves ends of the mullions.

12. In a car roof, in combinaton, roof sheathing, said roof sheathing being offset at the eaves to receive a flashing, roof sheets overlying said sheathing, and a flashing secured in said offset portion of said roof sheathing, said flashing having a portion depending over the outside line of the car, the eaves ends of said roof sheets extending over the ends of said sheathing and terminating in a depending flange provided with a rigidifying bead, said roof sheets extending over said flashing and normally out of contact therewith.

13. A mullion cap comprising a top portion and depending side flanges normally spaced from the mullion, portions of said side flanges being adapted to engage the side edges of the mullion to form abutments for limiting the relative movement between said cap and mullion, said cap also having a flanged portion underlying the said mullion.

14. In a car roof, in combination with the carlines, roof sheets overlying the same, a flashing secured to said car adjacent the eaves ends of the car, and means for spacing the eaves ends of said roof sheets from said flashing, the eaves ends of said sheets being formed with a down turned flange terminating in an outwardly projecting rigidifying bead, the said bead being spaced above the flashing inwardly of the outer edge thereof.

15. In a car roof, in combination, a roof sheathing having offsets adjacent the eaves ends thereof, a flashing positioned in the offset ends of said sheathing, said flashing having a pair of substantially horizontal surfaces joined by an upright surface, and roof sheets overlying said sheathing, said roof sheets also overlying said flashing and spaced from the horizontal surfaces thereof.

16. In a car roof, the combination with roof sheathing having gained out eaves portions, of a fascia strip positioned adjacent the end of said sheathing, a flashing overlying the gained out end of said sheathing and adapted to extend over the fascia strip, one end of said flashing having a return bend therein, and a roof sheet overlying said flashing, said sheet having a down turned flange terminating in a rigidifying bead, said sheet being spaced from the adjacent portions of said flashing.

17. In a car roof, the combination with roof sheathing having gained out eaves portions, of a fascia strip positioned adjacent the end of said sheathing, a flashing positioned in said gained out portion of said sheathing, said flashing having portions lying in spaced substantially horizontal planes, an upright wall connecting said portions, and a roof sheet overlying said flashing, said sheet having a terminal flange formed with a return bend, said terminal flange and return bend being spaced respectively from said upright wall and one of said horizontal portions of said flashing.

18. A mullion cap comprising a top portion and depending side flanges normally spaced from the side edges of the mullion the ends of the side flanges being bent inwardly to engage the mullion to maintain the cap in its normal position.

In testimony whereof I have hereunto set my hand.

THOMAS NATHAN RUSSELL.